(12) United States Patent
Venkatachalam et al.

(10) Patent No.: US 12,449,384 B2
(45) Date of Patent: *Oct. 21, 2025

(54) INSPECTION SYSTEM

(71) Applicant: Varex Imaging Corporation, Salt Lake City, UT (US)

(72) Inventors: Rajashekar Venkatachalam, Cypress, TX (US); David T Nisius, Des Plaines, IL (US); Clyde May, Gulf Breeze, FL (US); John Iman, Houston, TX (US)

(73) Assignee: Varex Imaging Corporation, Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 18/194,602

(22) PCT Filed: Jan. 13, 2023

(86) PCT No.: PCT/US2023/060695
§ 371 (c)(1),
(2) Date: Mar. 31, 2023

(87) PCT Pub. No.: WO2023/137474
PCT Pub. Date: Jul. 20, 2023

(65) Prior Publication Data
US 2024/0361258 A1 Oct. 31, 2024

Related U.S. Application Data

(60) Provisional application No. 63/299,329, filed on Jan. 13, 2022.

(51) Int. Cl.
*G01N 23/18* (2018.01)
*B23K 31/12* (2006.01)
(Continued)

(52) U.S. Cl.
CPC .......... *G01N 23/18* (2013.01); *B23K 31/125* (2013.01); *G01N 23/04* (2013.01); *G01N 23/083* (2013.01);
(Continued)

(58) Field of Classification Search
CPC ...... G01N 23/18; G01N 23/04; G01N 23/083; G01N 2223/303; G01N 2223/3303;
(Continued)

(56) References Cited

U.S. PATENT DOCUMENTS 4,422,177 A * 12/1983 Mastronardi ........ A61B 6/0487
378/10
5,663,806 A 9/1997 Grise et al.
(Continued)

FOREIGN PATENT DOCUMENTS

WO 2005022195 3/2005

OTHER PUBLICATIONS

Int'l Appl. No. PCT/US2023/060695, International Search Report dated May 10, 2023.
(Continued)

*Primary Examiner* — Courtney D Thomas
(74) *Attorney, Agent, or Firm* — Dorsey & Whitney LLP (57) ABSTRACT

Some embodiments include an inspection system, comprising: a radiation source; a radiation detector including an imaging array; a support structure configured to maintain a spatial relationship between the radiation source and the radiation detector; a motion control system configured to move an object relative to the radiation detector; control logic configured to: control the motion control system to move the object relative to the radiation detector; and combine data from multiple frames from the radiation detector as the object moves relative to the radiation detector into a single image.

20 Claims, 5 Drawing Sheets

(51) Int. Cl.
　　　*G01N 23/04* (2018.01)
　　　*G01N 23/083* (2018.01)
(52) U.S. Cl.
　　　CPC .......... *G01N 2223/303* (2013.01); *G01N 2223/3303* (2013.01); *G01N 2223/501* (2013.01)
(58) Field of Classification Search
　　　CPC ..... G01N 2223/501; G01N 2223/3306; G01N 2223/3307; G01N 2223/629; B23K 31/125; G01T 1/17
　　　See application file for complete search history.

(56) References Cited

U.S. PATENT DOCUMENTS

| | | |
|---|---|---|
| 8,767,912 B1 | 7/2014 | Alzaidi |
| 11,733,182 B2 * | 8/2023 | May .................. G01N 23/04 378/59 |
| 2002/0154811 A1 | 10/2002 | Katsuta et al. |
| 2011/0286005 A1 | 11/2011 | Yamamoto et al. |
| 2022/0299451 A1 * | 9/2022 | Sano .................. G01N 23/083 |

OTHER PUBLICATIONS

Int'l Appl. No. PCT/US2023/060695, Written Opinion dated May 10, 2023.

* cited by examiner

INSPECTION SYSTEM

Welds in large structures, such as large bore pipe welds, may be inspected through radiography. A radiographic source and film or detector may be stepped along the weld to generate overlapping images of the weld. The film may need to be developed before inspection. In addition, multiple images may be required for particularly large structures.

DETAILED DESCRIPTION

Embodiments include an inspection system. Some embodiments include large bore weld inspection with assisted defect recognition that uses photon counting detectors, automation methods for faster inspection and data collection using time delayed imaging techniques.

Large bore welds may be inspected using film or computed radiography techniques. In some cases, digital radiography is used but the over-all inspection time is relatively long. As an example, using a digital detector array (DDA), inspect a circumferential weld in a 9 meter (m) diameter large bore pipe may take close to 4 hours. The inspection time with film may be much longer. Embodiments described herein may significantly reduce the inspection time.

Figure 1A:
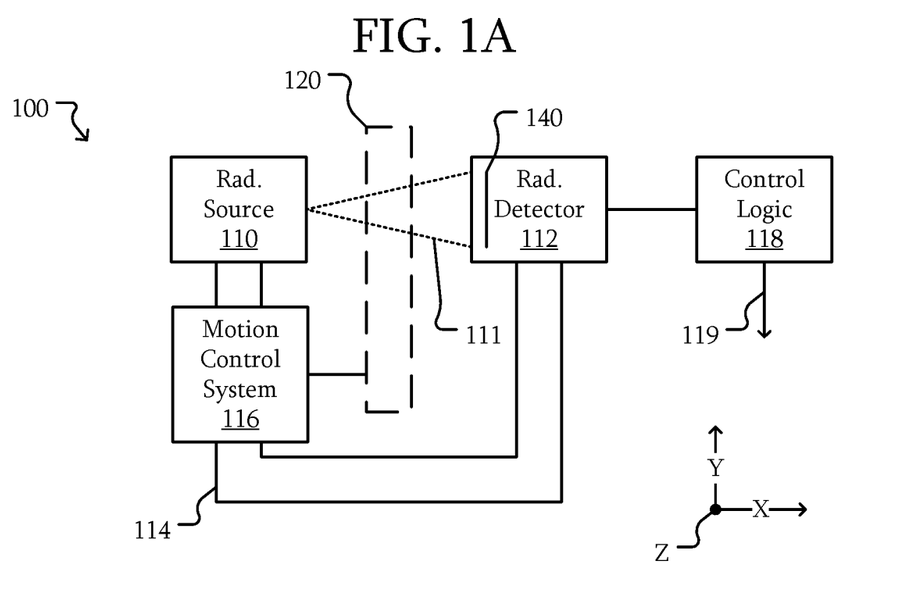
FIG. 1A is a block diagram of an inspection system according to some embodiments.
Figure 1B:
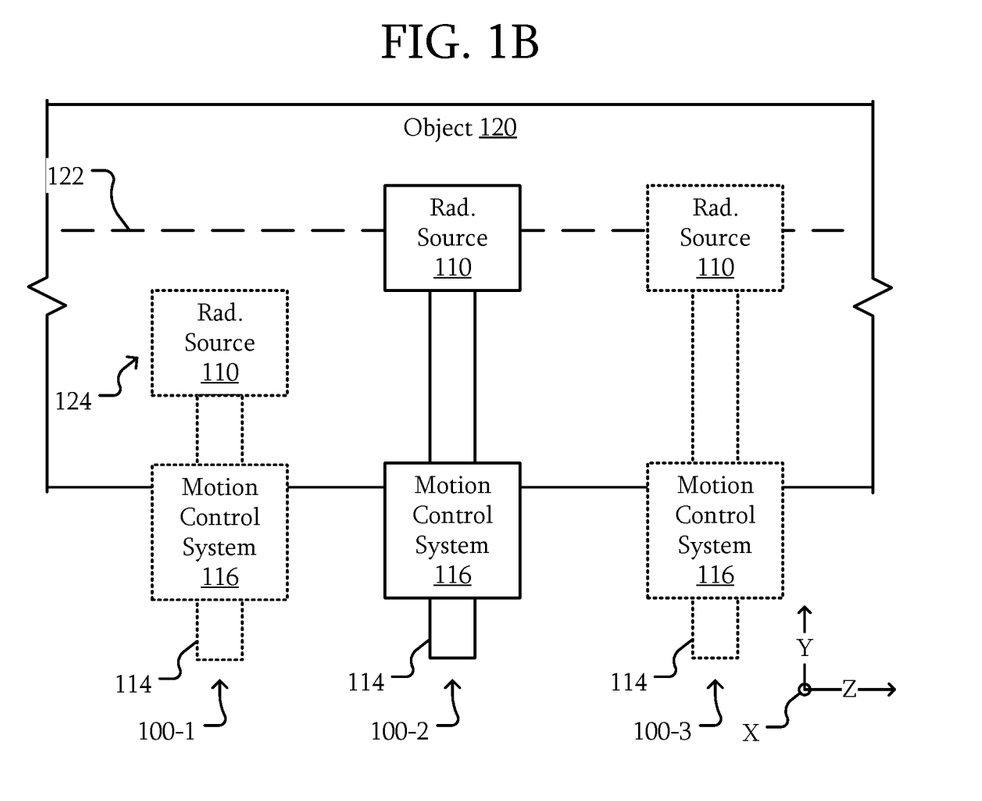
FIG. 1B is a block diagram of an inspection system in various positions relative to an object according to some embodiments.

FIG. 1A is a block diagram of an inspection system according to some embodiments. FIG. 1B is a block diagram of an inspection system in various positions relative to an object according to some embodiments. Referring to FIGS. 1A and 1B, the inspection system 100 includes a radiation source 110, a radiation detector 112, a support structure 114, a motion control system 116, and control logic 118.

The radiation source 110 may include an x-ray source (such as a 150 kilovolt (kV) x-ray tube), a radioisotope such as Ir-192, or the like. The radiation detector 112 may include any type of detector corresponding to the type of the radiation source 110. The radiation detector 112 includes an imaging array 140. In some embodiments, the radiation detector 112 may include a include direct conversion sensors, including cadmium telluride (CdTe), cadmium zinc telluride (CdZnTe or CZT), selenium, or the like, configured to directly convert the radiation 111 into a signal. In some embodiments, the radiation detector 112 includes a conversion screen, scintillator, or the like to convert the radiation 111 into wavelengths detectable by the imaging array 140 of the detector 102. For example, a scintillator may include gadolinium oxysulfide ($Gd_2O_2S$; GOS; Gadox), gadolinium oxysulfide doped with terbium ($Gd_2O_2S$:Tb), cesium iodide (CsI), or the like. Although some materials of the scintillator have been used as examples, in other embodiments, the material may be different depending on the particular radiation 111. In some embodiments, the radiation detector 112 includes a line, linear, or strip scanner or detector where the width of the detector (e.g., along the Z-axis or direction of motion) is 1 to 512 pixels wide and the length of the detector (e.g., along the Y-axis) has ten (10) times or hundred (100) times more pixels than the width. In some embodiments, the radiation detector 112 includes an area detector. For example, in an area detector the number of pixels in one dimension of the plane (e.g., length or width) is less than 10 times the other dimension (e.g., width or length).

The support structure 114 is a structure configured to maintain a spatial relationship between the radiation source 110 and the radiation detector 112. The motion control system 116 is coupled to the support structure 114.

The motion control system 116 is configured to move an object 120 relative to the radiation detector 112. In some embodiments, the support structure 114 is stationary. The motion control system 114 is configured to move the object 120. In some embodiments, motion control system 114 is configured to move the object 120, such a tube or pipe, in a circular pattern, where an ending position may return to a starting position. In other embodiments, the support structure 114 is mobile and the object 120 is stationary. In some embodiments, the support structure 114 moves in circular pattern around circular object 120, such a tube or pipe. In other embodiments, the both the support structure 114 and the object are movable by the motion control system 116. The motion control system 114 is configured to move the support structure 114 relative to the object 120.

The support structure 114 is configured to place the radiation source 110 and the radiation detector 112 in a relationship around the object 120 such that a region of interest 122 of the object 120 may be inspected. Examples of the object 120 include walls, pipes, or the like. The object 120 may include different objects 120, such as planar structures, tubular structures, planar welds, any substantially continuous joint, or the like. A substantially continuous joint is a joint that may have some discontinuities, but functions as a single joint.

The control logic 118 may include a general purpose processor, a digital signal processor (DSP), an application specific integrated circuit (ASIC), a microcontroller, a programmable logic device (such as field programmable gate array (FPGA)), discrete circuits, a combination of such devices, or the like. The control logic 118 may include interfaces, to connect the control logic 118 to internal and external components such as the radiation source 110, the radiation detector 112, the motion control system 116, or the like. The control logic 118 may be configured to control the variety of operations described herein.

The control logic 118 is configured to control the motion control system 116 to move the object 120 relative to the radiation detector 112. As the object 120 moves relative to the radiation detector 112, the control logic 118 is configured to acquire multiple frames from the radiation detector 112. The control logic 118 is configured to generate a single image 119 from the multiple frames as the object 120 moves relative to the radiation detector 112.

In some embodiments, the motion control system 116 is configured to move the radiation source 110 and the radiation detector 112 along a surface of the object 120. For example, the motion control system 116 may include tracks, pulleys, pistons, motors, gears, or the like to move the radiation source 110 and the radiation detector 112 in the Y-Z plane. In some embodiments, the surface of the object 120 may be a curved surface, such as a pipe or tube. The motion control system 116 may be configured to move the radiation source 110 and the radiation detector 112 such that the X axis is perpendicular to the surface of the object 120 or the Y-Z plane is tangential to the surface of the object 120 at that position.

The inspection system 100 is illustrated in three different positions (100-1, 100-2, and 100-3) relative to the object 120. The control logic 118 may cause the motion control system 116 to position the radiation source 110 and the radiation detector 112 in position 100-1 on a region 124 of the object 120 outside of a region of interest 122. For example, the region of interest 122 may include an inspection region, such as a welded joint. The region 124 of the object 120 outside of the region of interest 122 may include a portion of the object 120 that is continuous, such as a wall of a pipe without a weld, opening, or other structure.

The control logic 118 may be configured to perform an acquisition with the radiation source 110 and radiation detector 112 on the region 124 of the object 120 outside of the region of interest 122. For example, the control logic 118 may be configured to cause the motion control system 116 to move the radiation source 110 and radiation detector 112 along the Y and Z axes to be aligned with the region 124. The region 124 may be a predetermined position, a position designated by a user of the inspection system 100, or the like. Once at the region 124, the control logic 118 may be configured to cause the radiation source 110 to emit radiation 111 that passes through the region 124 of the object 120 and is detected by the radiation detector 112.

The control logic 118 may be configured to perform a calibration procedure based on the acquisition of the region 124 of the object 120 outside of the region of interest 124. For example, the acquisition of the region 124 may be used to perform a gain calibration.

The control logic 118 may be configured to cause the motion control system 116 to move the radiation source 110 and radiation detector 112 into position 100-2. In position 100-2, the radiation source 110 and radiation detector 112 are disposed to acquire a frame based on a portion of the region of interest 122. The control logic 118 may be configured to cause the motion control system 116 to move the radiation source 110 and radiation detector 112 to a different position 100-3. In position 100-3, the radiation source 110 and radiation detector 112 are disposed to acquire a frame based on a different portion of the region of interest 122. In this example, the movement from position 100-2 to 100-3, is along the Z axis. However, the movement to different positions may be along different axes, combinations of axes, include rotation, or the like. The different position 100-3 is illustrated as significantly offset from the position 100-2; however, the offset may be on the order of a pixel pitch, multiple pixels, or the like.

As described above, a calibration procedure may have been performed at region 124. The control logic 118 may be configured to adjust data of the frames from positions 100-2, 100-3, or the like. For example, a contribution of the thickness of the object 120, variation in gain of the imaging array 140, variation in intensity of the radiation 111, or the like may be reduced or eliminated from the resulting image 119.

In some embodiments, the calibration procedure may be performed without removing the inspection system 100 from around the object 120. In some embodiments, the calibration procedure is performed without performing a calibration with no object 120 between the radiation source 110 and the radiation detector 112; however, in some embodiments, the calibration process may use some data from a calibration procedure with no object 120 present. For example, the radiation source 110 and the radiation detector 112 may be moved to position 100-1 on the object 120 to perform the calibration. The radiation source 110 and the radiation detector 112 may then be moved to position 100-2 to begin the inspection of the region of interest 122. For inspection of large diameter pipes, it may be difficult, time consuming, or the like to pull out the radiation detector 112, radiation source 110, and/or the entire inspection system 100 outside of the object 120 just for the purpose of doing gain calibration.

In some embodiments, the control logic 118 is configured to operate the radiation source 110 and the radiation detector 112 using a step-and-expose technique. For example, the control logic 118 may cause to motion control system 116 to move the radiation source 110 and the radiation detector 112 by a step distance, such as a pixel width, a width of a series of pixels, or the like of the radiation detector 112. While the radiation source 110 and the radiation detector 112, a frame may be acquired by the control logic 118. The control logic 118 may then cause the motion control system 116 to move the radiation source 110 and the radiation detector 112 by a step distance and repeat the acquisition of a frame. The technique may be repeated so that frame may be acquired of the entire region of interest 112 are performed and combined into a single image 119.

In some embodiments, the control logic 118 is configured to control the motion control system 116 to move the object 120 substantially continuously relative to the radiation detector 112. While the object 120 moves substantially continuously relative to the radiation detector 112, the frames from the radiation detector 112 may be acquired. Those frames may be combined as into the single image 119. That is, instead of stopping the motion of the radiation source 110 and the radiation detector 112 relative to the object 120 when acquiring frames with the radiation detector 112, the frames may be acquired as the object 120 moves relative to the radiation source 110 and the radiation detector 112. "Substantially" as used relative to moving the object 120 continuously or at constant speed can includes some variation in speed, such as a variation of about +/−10%.

In a particular example, the radiation detector 112 is a photon counting based direct conversion detector. The control logic 118 may be configured to operate the radiation detector 112 in a the time delayed integration (TDI) mode. TDI may be referred to time delayed summation (TDS) when applied to photon counting detectors. As the object 120 is moved substantially continuously relative to the radiation source 110 and radiation detector 112, images may be acquired such that a subsequent image is acquired substantially at the time after the object 120 has moved the pitch of a pixel of the imaging array in the direction of motion. "Substantially" as used relative to image acquisition time may include latency processing delays. TDI is the process of adding or summing together multiple exposures of the same point on an object as it passes a detector. The multiple exposures are readout from sequential or subsequent rows of pixels along the direction of motion and added together (in a register) until all the rows for the same point on the object are summed, which are combined with other summed exposures to generate the image 119. Conventionally, 2 to 512 rows of pixels can be used in TDI. Not only does TDI mode allow for images to be taken of fast moving objects, it also enables images to be taken of objects with low X-ray dose.

In some embodiments, the control logic 118 is not synchronized with the motion control system 116. For example, the motion control system 116 may be configured to move the object 120 relative to the radiation detector 112 at a substantially constant speed but with some variation such as a variation of about +/−10%. However, the control logic 118 may not have sensing or feedback associated with the actual speed. As will be described in further detail below, the control logic 118 may operate the detector in a manner to accommodate the uncertainty of the speed. In some embodiments a calibration procedure may be performed while the object 120 is in motion. A calibration feature, such as a washer, cylinder, or the like with known dimensions may be attached to the object 120. The control of the acquisition of frames by the control logic 118 may be adjusted such that the dimensions of the feature in the single image 116 are substantially proportional to the actual dimensions of the feature. In some embodiments, the calibration performed using region 124 as described above may be performed with the object 120 stationary, but used on frames acquired when the object 120 is in motion. Substantially proportional includes variations within the resolution of the radiation detector 112 and mechanical tolerances of the feature.

In some embodiments, the radiation detector 112 used in the TDI mode may achieve a threshold image quality at a speed of 1 inch per second (in/s) or faster. The inspection at this speed may provide a desired image quality greater than a threshold. An example of a threshold image quality is a desired basic spatial resolution (BSR), such as 100 microns, 80 microns, 50 microns, or the like.

In some embodiments, the inspection may be performed at a faster speed (such as 2 in/s or more) using a two-step process. For example, the control logic 118 may be configured to cause the motion control system 116 to move the object 120 a first speed. This first speed may be greater than a threshold speed. The threshold speed may include a speed above which an acquired image may have an insufficient quality for inspection of a defect. For example, the threshold speed may be about 1.5 in/s and the first speed may be 2 in/s. The first speed may be a speed at which a potential defect in the object 120 may still be identified but the image quality is less than desired for inspection of that defect.

In response to an indication of a defect, the control logic 118 is configured to cause the motion control system 116 to move the object 120 to move at a second speed that is less than the first speed. The second speed may be less than the threshold speed. As a result, the object 120 may be moving relative to the radiation source 110 and the radiation detector 112 at a speed at which a desired image quality may be obtained. The higher first speed may be used for screening defects. Once a potential defect is identified, that specific area could be imaged at the lower second speed to obtain the final desired image quality. While 2 in/s and 1 in/s have been used as examples of inspection speeds, and 1.5 in/s has been used as an example of a threshold speed, the inspection speeds and the threshold speed may be different. For example, the second speed may be higher and the first speed may be lower. In another example, the second speed setting may be lower and the first speed setting may be higher, where the second speed is still less than the first speed.

In some embodiments, the inspection system 100 may operate in an automated mode to continuously acquire the image 119 when the object 120 is in motion. For example, an operator may start the process of inspection. The inspection system 100 may automatically radiograph the entire region of interest 122 without any manual intervention. At the end, the image 119 may be presented as a series of images or a single image that could be scrolled from left to right, up and down, panned in multiple dimensions, or the like to inspect the entire image 119.

Figure 2:
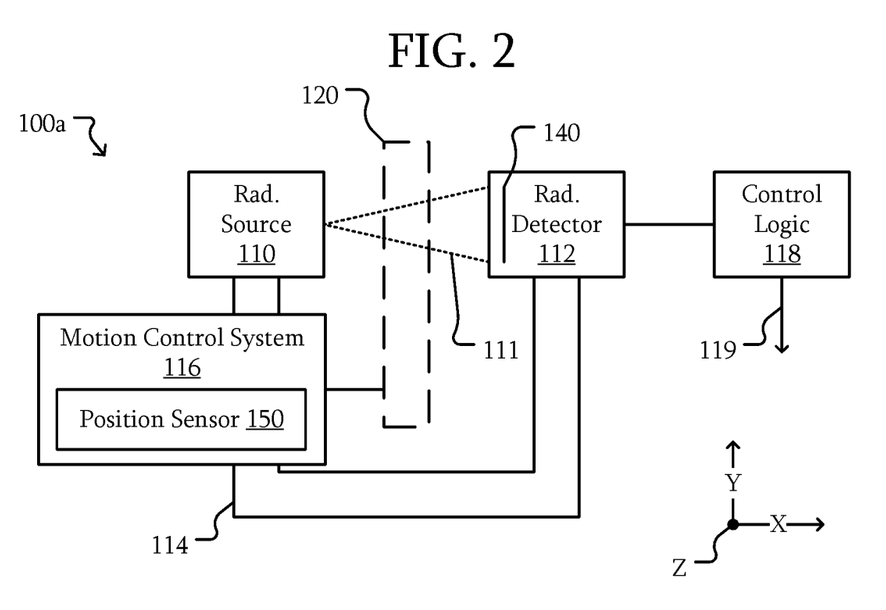
FIG. 2 is a block diagram of an inspection system with position feedback according to some embodiments.

Other techniques, such as film, computer radiography or a-Si (amorphous silicon) based indirect digital detector arrays may have significantly longer inspection times compared to various embodiments described herein. Area detectors with step and expose may take longer FIG. 2 is a block diagram of an inspection system with position feedback according to some embodiments. The inspection system 100a may be similar to the inspection system 100 or the like. However, the inspection system 100a includes a position sensor 150 configured to determine a position of the object 150 relative to the radiation detector 112. While the position sensor 150 is illustrated as part of the motion control system 116, in other embodiments, the position sensor 150 may be a separate component, part of the support structure 114, or some other part of the inspection system 100a. Although the position sensor 150 has been described as a singular sensor, the position sensor 150 may be configured to sense position and/or orientation of the radiation source 110 and the radiation detector 112 relative to the object 120.

The position sensor 150 may include any device capable of determining a relative position of the radiation source 110 and the radiation detector 112 to the object 120. For example, the position sensor 150 may include encoders that are part of or attached to motors of the motion control system 116 configured to move the object 120. In some embodiments, the position sensor 150 may a sensor configured to sense regular marks on the object 120.

In some embodiments, the control logic 118 is configured to control the motion control system 116 based on the position sensor 150. In some embodiments, the control logic 118 may be configured to determine a position of the object 120 relative to the radiation source 110 and the radiation detector 112. The control logic 118 may trigger an acquisition of a frame after the object has moved a predetermined distance. The predetermined distance may be based on a pixel pitch of the imaging array 140, a multiple of the pixel pitch, or the like. In some embodiments, the control logic 118 may be configured to obtain a speed from the position sensor 150. The control logic 118 may be configured to control a frequency of the acquiring of frames using the radiation detector 112 based on the speed. The frequency may include a rate at which frames are acquired such that the feature described above has substantially the same dimensions in the image 119. In another example, the control logic 118 may be configured to obtain a position from the position sensor 150 and convert the position into a speed and control the acquiring of frames as described above.

In some embodiments, a relative speed of the inspection system to the object to be scanned may not be controlled by feedback, may have a significant variability, or the like. For example, the object 120 may be moved, such as by being rotated. In an example, where the object 120 is a pipe or tube or a hollow cylinder, the object may be rotated by a roller mechanism. The linear speed of the object moving by the imaging system may vary by about +/−10% or more. Accordingly, TDI may introduce artifacts, reduce the effective resolution, reduce contrast to noise ratio, or otherwise result in a reduced image quality.

In some embodiments, a feedback loop may be created between the inspection system the object such that the summing, averaging, or other combination of data may be based on the relative speed of the object. For example, a time of acquiring a frame, locations of pixels that are combined, or the like may be modified based on the relative speed.

Figure 3:
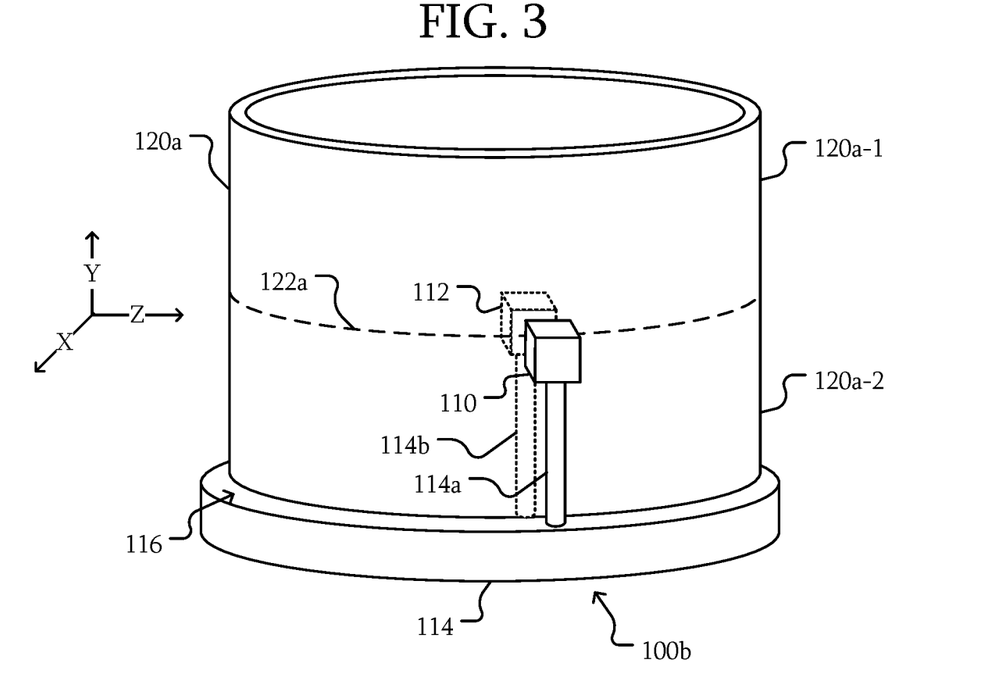
FIG. 3 is a block diagram of an inspection system for a large bore pipe according to some embodiments.

FIG. 3 is a block diagram of an inspection system for a large bore pipe according to some embodiments. In some embodiments, the inspection system 100b may be similar to the inspection systems 100, 100a, or the like as described above. The inspection system 100b may be used to inspect welds 122a on a large bore pipe 120a. The support structure 114 may include two telescoping portions 114a and 114p configured to adjust a height along the Y axis. The motion control system 116 may be configured to rotate the pipe 120a about a major axis of the pipe that extends parallel to the Y axis. The weld 122a may be substantially parallel to the X-Z plane. Substantially parallel may include some variation along the length such as variation due to manufacturing the ends of the sections of pipe 102a-1 and 120a-2. When the pipe 120a is rotated, portions of the weld 122a may pass between the radiation source 110 and the radiation detector 112. An inspection may be performed along the entire circumference of the pipe 120a.

The radiation source 110 may be disposed on an exterior of the pipe 120a. The radiation detector 112 may be disposed on an interior of the pipe 120a as illustrated by the dashed lines. However, in other embodiments, the positions of the radiation source 110 and the radiation detector 112 may be reversed.

In some embodiments, the inspection system may be used for any pipe 120a geometry based inspection where the pipe 120a can be moved or rotated at a substantially constant speed with access to the surface on both the sides of the pipe 120a.

Figure 4:
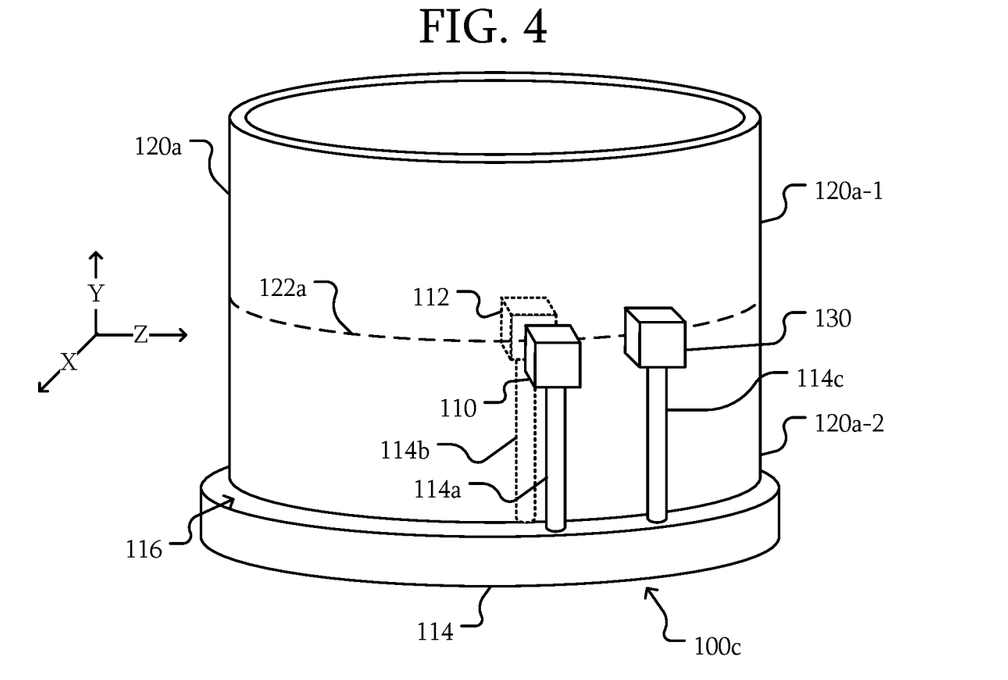
FIG. 4 a block diagram of a welding and inspection system for a large bore pipe according to some embodiments.

FIG. 4 a block diagram of a welding and inspection system for a large bore pipe according to some embodiments. In some embodiments, the welding and inspection system 100c may be similar to the inspection system 100b of FIG. 3 as described above, or the like. However, the welding and inspection system 100c includes a welder 130 supported by the support structure 114. While the welder 130 is illustrated as being on an exterior of the pipe 120a, in other embodiments, the welder 130 may be disposed on an interior of the pipe 120a or include components on both the interior and exterior of the pipe 120a.

The welder 130 may include a device configured to weld two sections of pipe 102a-1 and 120a-2 together. Examples of the welder 130 include a tungsten inert gas (TIG) welder, metal inert gas (MIG) welder, an arc welder, or the like.

The motion control system 116 is configured to move the radiation source 110 and the radiation detector 112 with the welder 130 such that the radiation detector 112 passes over a portion of the pipe 120a after the welder 130. As a result, the inspection of a weld 122a may be performed substantially in parallel with the welding, reducing the total time to form the weld 122a and inspect the weld 122a, and reducing the total production time. Being performed substantially in parallel includes performing at least some of the inspection using the radiation source 110 and the radiation detector 112 while at least some part is being welded by the welder 130.

As an example, a desired image quality on the weld radiograph can be obtained when the speed of motion of the large bore pipe was set to rotate at 1 inch per second (in/s). This would mean the inspection time for a 9 m diameter pipe may be reduced from 4 hours to about 20 minutes.

In some embodiments, the inspection system speed and/or the parallelism of welding and inspection may reduce or eliminate the inspection process as a production bottleneck. The inspection operation may be equivalent or faster in speed to the actual welding process. However even if the inspection process is slower than the welding process, the welding process may be slowed, but still performed substantially in parallel with the inspection.

Figure 5:
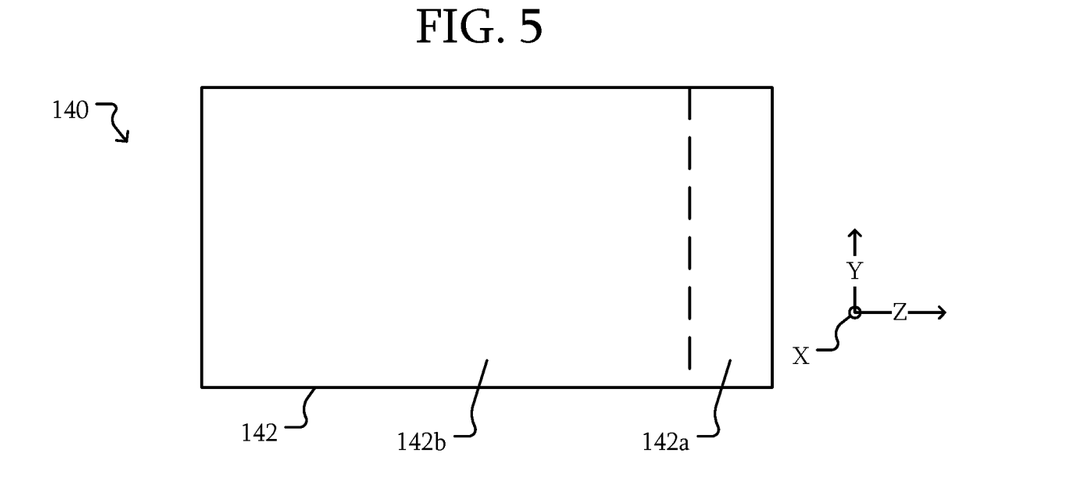
FIG. 5 is a block diagram of an imaging array of an inspection system according to some embodiments.

FIG. 5 is a block diagram of an imaging array of an inspection system according to some embodiments. Referring to FIGS. 1A, 1B, and 5, in some embodiments, the TDI may be performed on a detector, where a set of pixels used for TDI are smaller than the entire imaging array 140. For example, the imaging array may include pixels 142. The pixels 142 may be divided into two subsets 142a, and 142b. A dimension of the subset 142a of the array 140 may be shorter in the direction of motion of the object relative to the entire length of the array 140. Here, the direction of motion may be along the Z axis. The dimension of the subset 142a along the Z axis is smaller than the dimension of the pixels 142. The dimension may be the number of pixels, the physical length of the pixels, or the like. For example, for an array with 512 pixels in the direction of motion, the control logic 118 is configured to use data from only 60 pixels to generate data that is combined together. As a result, a variation in speed of the movement of the object may have a reduced impact on a contrast to noise ratio or other image quality factors.

In some embodiments, the dimension of the subset 142a in the direction of motion of the object 120 may be selected based on a desired image quality. As the dimension increases, a number of pixels providing data that is combined increases, resulting in an increased image quality. However, increasing the number of pixels in the subset 142a may increase the susceptibility of the system to variations in the speed of the object 120 relative to the radiation detector 112. In some embodiments, a number of pixels may be selected to achieve a contrast to noise ratio greater than a threshold, such as 2, 2.5, 10, or more with an expected variation in speed. In some embodiments, the number of pixels, a dimension of the subset 142a of the imaging array 140 in a direction of the motion of the object, and/or other parameters of the TDI operation may be selected based on a desired basic spatial resolution (BSR), such as 100 microns, 80 microns, 50 microns, or the like, based on the speed of the object 120 in the direction of motion, or based on other factors. The control logic 118 and/or the radiation detector 112 can determine the contrast to noise ratio and BSR during calibration for imaging an object 120 and the control logic 118 can select the desired contrast to noise ratio and desired BSR.

In some embodiments, an inspection system may reduce the time it takes for an inspector to interpret the data to assign a PASS/FAIL disposition. In the conventional inspection techniques, the inspector has to inspect a series of images to cover an entire region of interest of an object 120 such as the complete circumference of the pipe 120a. This may be a time-consuming process. There may be some amount of redundancy in the data to be inspected because of the overlap in regions between adjacent images. That is, to ensure that the entire region of interest is imaged, the adjacent images may overlap. Thus, the inspector may inspect the same portion of the region of interest twice.

In some embodiments, the image 119 becomes available to the operator as the scanning is performed. In addition, the inspector may review one large image 119 for a given object 120. The single image 119 may make data management easier. As an example, for a 9 m diameter pipe 120a, only 1 image may need to be inspected as compared with 100 or more radiographs.

In some embodiments, the inspection system may be configured to provide a portion of the scanned object as the scanning is being performed. For example, as a particular region of a weld is scanned over time, after a point in time but before the entire scan has been completed, the data that will contribute to a section of the weld may have been acquired. That data may be combined as described above and used to generate a partial image of the weld. That partial image may be provided to an inspector for interpretation. Thus, an inspector may not need to wait until the entire process has been completed.

Figure 6:
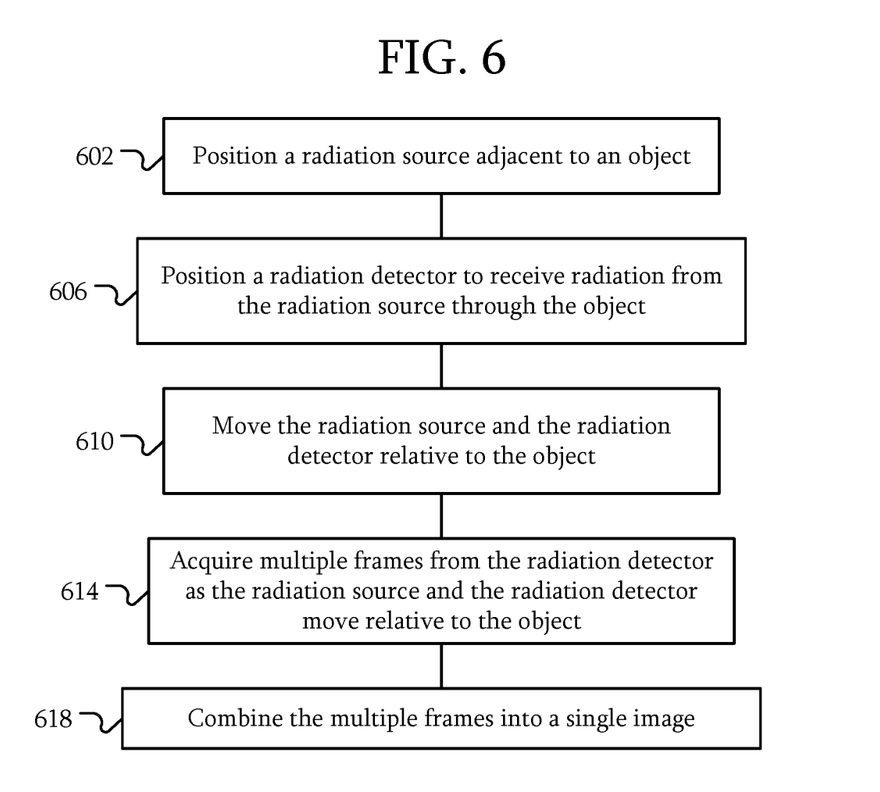
FIG. 6 is a flowchart of a technique of inspecting an object according to some embodiments.

FIG. 6 is a flowchart of a technique of inspecting an object according to some embodiments. The inspection system 100 of FIGS. 1A and 1B will be used as an example. Referring to FIGS. 1 and 6, in 602, a radiation source 110 is positioned adjacent to an object 120. In 606, a radiation detector 112 is positioned to receive radiation 111 from the radiation source through the object 120. Examples of the positioning of the radiation source 110 and the radiation detector 112 in 602 and 606 include moving the radiation source 110 and the radiation detector 112 into position 110-2 using the motion control system 116 and/or other components of the support structure 114. The radiation source 110 and the radiation detector 112 may be positioned to be on opposite sides of a region of interest 122, such as a weld 122a. The radiation source 110 and the radiation detector 112 may be positioned in other ways as described above.

In 610, the radiation source 110 and the radiation detector 112 are moved relative to the object 120. In 614, multiple frames are acquired from the radiation detector 112 as the radiation source 112 and the radiation detector 112 move relative to the object 120. For example, the object 120 and/or the radiation source 110 and the radiation detector 112 may be moved by the motion control system 116 and/or the support structure 114 and data may be acquired as described above.

In 618, the multiple frames are combined into a single image 119. The control logic 118 may be configured to combine the multiple frames as described above.

Figure 7:
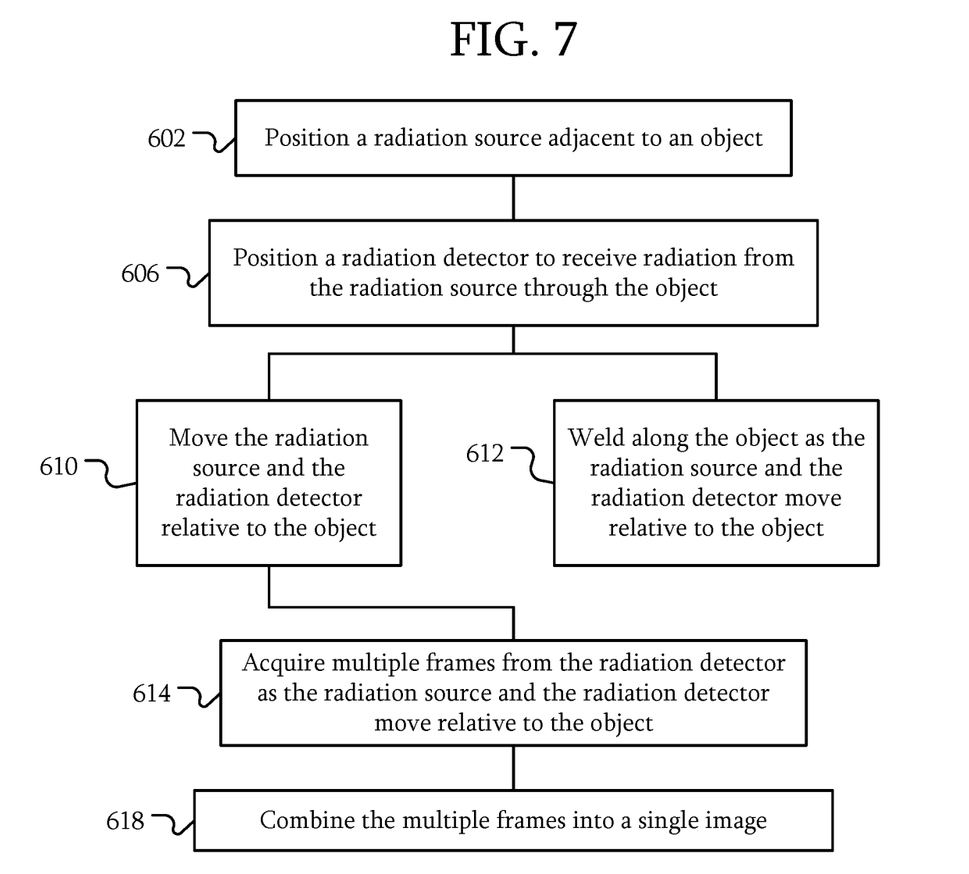
FIG. 7 is a flowchart of a technique of inspecting an object while welding the object according to some embodiments.

FIG. 7 is a flowchart of a technique of inspecting an object while welding the object according to some embodiments. The welding and inspection system 100c of FIG. 4 will be used as an example. Referring to FIGS. 3 and 7, the operations may be similar to those described above with respect to FIG. 6. However, in 612, welding is performed along the object 120 as the radiation source 110 and the radiation detector 112 move relative to the object 120. Although welding pipes 120a is used as an example, the welding and inspection may be performed on other structures.

An inspection system, comprising: a radiation source 110; a radiation detector 112 including an imaging array 140; a support structure 114 configured to maintain a spatial relationship between the radiation source 110 and the radiation detector 112; a motion control system 116 configured to move an object 120 relative to the radiation detector 112; control logic configured to: control the motion control system 116 to move the object 120 relative to the radiation detector 112; and combine data from multiple frames from the radiation detector 112 as the object 120 moves relative to the radiation detector 112 into a single image 119.

In some embodiments, calibrate a frame rate of the radiation detector 112 based on a calibration feature of the object 120 while the object 120 moves relative to the radiation detector 112.

In some embodiments, the control logic is further configured to control the motion control system 116 to move the object 120 substantially continuously relative to the radiation detector 112; and combine the data from multiple frames from the radiation detector 112 as the object 120 moves substantially continuously relative to the radiation detector 112 into a single image 119.

In some embodiments, the support structure 114 is configured to support a welder 130; and the motion control system 116 is configured to move the radiation detector 112 with the welder 130 such that the radiation detector 112 passes over a portion of the object 120 after the welder 130.

In some embodiments, the control logic is further configured to: combine data from a subset of the imaging array 140 into the single image 119.

In some embodiments, a dimension of the subset of the imaging array 140 in a direction of the motion of the object 120 is based on a threshold contrast to noise ratio.

In some embodiments, a dimension of the subset of the imaging array 140 in a direction of the motion of the object 120 is based on a variability in a speed of the object 120 in a direction of the motion of the object 120.

In some embodiments, a dimension of the subset of the imaging array 140 in a direction of the motion of the object 120 is based on at least one of a threshold contrast to noise ratio and a threshold basic spatial resolution.

In some embodiments, the control logic is asynchronous with the motion control system 116.

In some embodiments, the control logic configured to combine data from the multiple frames from the radiation detector 112 into the single image 119 based on the speed of the motion of the object 120.

In some embodiments, the control logic is further configured to: combine data from a subset of the imaging array 140 using time delay integration (TDI).

In some embodiments, the control logic is further configured to: perform an acquisition on a region of the object 120 outside of a region of interest; and perform a calibration procedure based on the acquisition of the region of the object 120 outside of the region of interest.

In some embodiments, the control logic is further configured to: set a frame rate of an acquisition of the detection based on proportional dimensions of a calibration feature in the calibration procedure.

In some embodiments, the control logic is further configured to: control the motion of the object 120 to move at a first speed; and in response to an indication of a defect, control the motion of the object 120 to move at a second speed that is less than the first speed.

In some embodiments, the inspection system further comprises a position sensor 150 configured to determine a position of the object 120 relative to the radiation detector 112; wherein the control logic configured to control the motion control system 116 based on the position sensor 150.

A method, comprising: positioning a radiation source 110 adjacent to an object 120; positioning a radiation detector 112 to receive radiation from the radiation source 110 through the object 120; moving the radiation source 110 and the radiation detector 112 relative to the object 120; and acquiring multiple frames from the radiation detector 112 as the radiation source 110 and the radiation detector 112 move relative to the object 120; and combining the multiple frames into a single image 119.

In some embodiments, moving the radiation source 110 and the radiation detector 112 relative to the object 120 comprises moving the radiation source 110 and the radiation detector 112 relative to the object 120 substantially continuously; and acquiring the multiple frames from the radiation detector 112 as the radiation source 110 and the radiation detector 112 move relative to the object 120 comprises acquiring the multiple frames from the radiation detector 112 as the radiation source 110 and the radiation detector 112 move substantially continuously relative to the object 120.

In some embodiments, the method further comprises welding along the object 120 as the radiation source 110 and the radiation detector 112 move relative to the object 120.

In some embodiments, acquiring the multiple frames from the radiation detector 112 as the radiation source 110 and the radiation detector 112 move relative to the object 120 comprises acquiring the multiple frames using a subset of an imaging array 140 of the radiation detector 112.

In some embodiments, combining the multiple frames into a single image 119 comprises combining the multiple acquisitions using time delay integration (TDI).

An inspection system, comprising: means for generating radiation; means for detecting radiation from the means for generating radiation through an object; means for moving the means for generating radiation and the means for detecting radiation relative to the object; means for acquiring multiple frames from the means for detecting radiation as the means for generating radiation and the means for detecting radiation move relative to the object; and means for combining data from the multiple frames as the object moves relative to the means for detecting radiation into a single image.

Examples of the means for generating radiation include the radiation source 110.

Examples of the means for detecting radiation from the means for generating radiation through an object include the radiation detector 112.

Examples of the means for moving the means for generating radiation and the means for detecting radiation relative to the object include the support structure 114 and the motion control system 116.

Examples of the means for acquiring multiple frames from the means for detecting radiation as the means for generating radiation and the means for detecting radiation move relative to the object include the radiation detector 112 and the control logic 118.

Examples of the means for combining data from the multiple frames as the object moves relative to the means for detecting radiation into a single image include the radiation detector 112 and the control logic 118.

In some embodiments, the inspection system further comprises means for performing time delay integration using the multiple acquisitions. Examples of the means for performing time delay integration using the multiple acquisitions include the radiation detector 112 and the control logic 118.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description.

These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112 (f). Embodiments of the invention in which an exclusive property or privilege is claimed are defined as follows.

The invention claimed is:

1. An inspection system comprising:
   a radiation source comprising a radioisotope;
   a radiation detector including an imaging array;
   a support structure configured to maintain a spatial relationship between the radiation source and the radiation detector;
   a motion control system configured to move an object relative to the radiation detector; and
   control logic configured to:
      control the motion control system to move the object relative to the radiation detector; and
      combine data from multiple frames from the radiation detector as the object moves relative to the radiation detector into a single image.

2. The inspection system of claim 1, wherein:
   the control logic is further configured to calibrate a frame rate of the radiation detector based on a calibration feature of the object while the object moves relative to the radiation detector.

3. The inspection system of claim 1, wherein the control logic is further configured to:
   control the motion control system to move the object substantially continuously relative to the radiation detector; and
   combine the data from multiple frames from the radiation detector as the object moves substantially continuously relative to the radiation detector into a single image.

4. The inspection system of claim 1, wherein:
   the support structure is configured to support a welder; and
   the motion control system is configured to move the radiation detector with the welder such that the radiation detector passes over a portion of the object after the welder.

5. The inspection system of claim 1, wherein the control logic is further configured to:
   combine data from a subset of the imaging array into the single image.

6. The inspection system of claim 5, wherein a dimension of the subset of the imaging array in a direction of the motion of the object is based on a threshold contrast to noise ratio.

7. The inspection system of claim 5, wherein a dimension of the subset of the imaging array in a direction of the motion of the object is based on a variability in a speed of the object in a direction of the motion of the object.

8. The inspection system of claim 5, wherein a dimension of the subset of the imaging array in a direction of the motion of the object is based on at least one of a threshold contrast to noise ratio and a threshold basic spatial resolution.

9. The inspection system of claim 8, wherein the control logic is asynchronous with the motion control system.

10. The inspection system of claim 1, wherein the control logic is configured to combine data from the multiple frames from the radiation detector into the single image based on the speed of the motion of the object.

11. The inspection system of claim 1, wherein the control logic is further configured to:
 combine data from a subset of the imaging array using time delay integration (TDI).

12. The inspection system of claim 1, wherein the control logic is further configured to:
 perform an acquisition on a region of the object outside of a region of interest; and
 perform a calibration procedure based on the acquisition of the region of the object outside of the region of interest.

13. The inspection system of claim 1, wherein the control logic is further configured to:
 set a frame rate of an acquisition of the detection based on proportional dimensions of a calibration feature in the calibration procedure.

14. The inspection system of claim 1, wherein the control logic is further configured to:
 control the motion of the object to move at a first speed; and
 in response to an indication of a defect, control the motion of the object to move at a second speed that is less than the first speed.

15. The inspection system of claim 1, further comprising:
 a position sensor configured to determine a position of the object relative to the radiation detector;
 wherein the control logic is configured to control the motion control system based on the position sensor.

16. A method comprising:
 positioning a radiation source adjacent to an object;
 positioning a radiation detector to receive radiation from the radiation source through the object;
 moving the radiation source and the radiation detector relative to the object;
 acquiring multiple frames from the radiation detector as the radiation source and the radiation detector move relative to the object;
 controlling a frequency of acquiring the multiple frames based on a speed of the radiation source and the radiation detector moving relative to the object; and
 combining the multiple frames into a single image.

17. The method of claim 16, wherein:
 moving the radiation source and the radiation detector relative to the object comprises moving the radiation source and the radiation detector relative to the object substantially continuously; and
 acquiring the multiple frames from the radiation detector as the radiation source and the radiation detector move relative to the object comprises acquiring the multiple frames from the radiation detector as the radiation source and the radiation detector move substantially continuously relative to the object.

18. The method of claim 16, wherein:
 acquiring the multiple frames from the radiation detector as the radiation source and the radiation detector move relative to the object comprises acquiring the multiple frames using a subset of an imaging array of the radiation detector.

19. An inspection system comprising:
 a radiation source for generating radiation;
 a radiation detector for detecting radiation from the radiation source through an object;
 a motion control system for moving the radiation source and the radiation detector relative to the object; and
 control logic configured for:
  acquiring multiple frames from the radiation detector as the radiation source and the radiation detector move substantially continuously relative to the object; and
  combining data from the multiple frames as the object moves relative to the radiation detector into a single image.

20. The inspection system of claim 19, wherein the control logic is further configured for performing time delay integration using the multiple acquisitions.

* * * * *